United States Patent [19]

Shaw

[11] Patent Number: 5,136,755
[45] Date of Patent: Aug. 11, 1992

[54] END CLAMP FOR COMPOSITE ROPE

[75] Inventor: Charles R. Shaw, Twinsburg, Ohio

[73] Assignee: Esmet, Inc., Canton, Ohio

[21] Appl. No.: 603,315

[22] Filed: Oct. 25, 1990

[51] Int. Cl.⁵ .............................................. F16G 11/05
[52] U.S. Cl. ..................................... 24/122.6; 29/461; 403/275
[58] Field of Search ............... 24/122.6, 136 R, 114.5; 403/275; 52/223 L, 230; 29/461

[56] References Cited

U.S. PATENT DOCUMENTS

| | | |
|---|---|---|
| 222,125 | 12/1879 | Brady . |
| 508,587 | 11/1893 | Trumbull . |
| 831,548 | 9/1906 | Fleeger . |
| 1,214,709 | 2/1917 | Orr ........................ 403/275 |
| 1,855,227 | 4/1932 | Fiege . |
| 2,266,357 | 12/1941 | Cooke . |
| 2,385,225 | 9/1945 | Nielsen ................... 403/275 |
| 2,533,064 | 12/1950 | Streader . |
| 3,716,894 | 2/1973 | Kingston et al. .......... 403/275 |
| 3,820,832 | 6/1974 | Brandestini et al. . |
| 3,952,377 | 4/1976 | Morell . |
| 4,509,233 | 4/1985 | Shaw . |
| 4,640,179 | 2/1987 | Cameron . |
| 5,022,780 | 6/1991 | Shaw ..................... 24/122.6 X |

FOREIGN PATENT DOCUMENTS 2286982 4/1976 France ...................... 403/275

Primary Examiner—James R. Brittain
Attorney, Agent, or Firm—Michael Sand Co.

[57] ABSTRACT

An improved end clamp and method for attachment to a light-weight, manipulatable readily-grasped composite line of relatively high strength for use by personnel involved in hazardous rescue or safety conditions. The clamp and its method of attachment may be used with a multi-layered composite rope comprised of several combined sheaths of plastic materials with or without a multi-strand central metallic core. The clamp is particularly useful with a static composite rope having very little stretch and which will withstand exposure to elevated temperatures, sharp objects, chemicals, sunlight or shock which do not produce failure in the rope or require its premature disposal. The clamp is relatively simple in construction and provides a pair of interlocking tapered metallic elements which may be quickly attached to the rope end to withstand an unusual amount of strain or loading equal to or greater than the actual breaking strength of the rope itself.

30 Claims, 10 Drawing Sheets

END CLAMP FOR COMPOSITE ROPE

BACKGROUND OF THE INVENTION

1. Technical Field

This invention relates to an improved rope clamp of the smallest possible size and one in which the holding strength or efficiency is not dependent upon the skill of fabricating personnel, and, more particularly, to a rope clamp for the terminating end of a composite rope having a metallic core and an outer sheath of fibrous plastic material, or made from multi-layered plastic materials. Such composite rope normally has a multi-strand metallic core surrounded by one or more outer sheaths of fibrous plastic material comprising a lightweight line capable of carrying heavy loads, which rope is widely used by rescue workers, firemen and in various safety applications. The rope is also frequently used in certain military and marine applications, the rope being resistant to severing, chemicals, shock and the like, and is also resistant to destruction by high temperatures such as may be encountered in fires or explosions. The subject rope clamp may also be used with a rope comprised of several separately-braided layers of fibrous plastic materials without the multi-strand metallic core.

A primary purpose of this invention is to meet the military and commercial requirements for a rope end clamp, and which satisfies all of the following requirements for the termination of fibrous synthetic and composite synthetic ropes:

(1) The outer diameter being as near as possible to that of the rope.

(2) A rope clamp that will hold the full strength of the rope.

(3) A rope clamp whose holding strength is consistent and does not vary in large amount from one clamp to another.

(4) A rope clamp whose holding strength is not dependent upon the ability of assembly personnel.

The herein-disclosed embodiments of the subject rope clamp utilize a unique combination of wedging elements and proven assembly techniques for a new and unique design of outer swagged-type of rope end clamp.

2. Background Information

Previously, composite ropes fabricated of both metallic and plastic materials into multi-layered flexible lines have been well-known for use in survival-type situations as well as in mountaineering and other hazardous conditions. Their use in such hazardous conditions has been limited by their inherent nature such as in the event of fire or high-temperature applications. The nylon, polyester or other synthetic materials used in the manufacture of such ropes may melt or burn, or may be so severely weakened by heating that the rope becomes unsafe for further use. Such composite ropes having a metallic core are not easily knotted around stable fixtures and require an improved terminating end clamp to join the rope to a suitable fitting such as a clevis or other connecting member. U.S. Pat. No. 1,855,227 to Fiege discloses a single wedging plug employed in an inner conical recess to clamp a metallic cable to a clevis or turnbuckle. Such clamp is not applicable to use with a composite rope formed of different layered materials, such as one having a metallic core surrounded by plastic sheaths.

Composite ropes which are subjected to applications where they come into contact with rock outcropping or other sharp objects, such as in mountaineering or fire fighting, may be severed or partially severed since the synthetic plastic materials utilized in their outer construction are not highly resistant to chafing and severing. Further, if the outer plastic sheath be severed or partially severed, the multi-layer construction allows the individual outer layers to slip along the inner metallic core or move axially relative to one another making the line difficult to grasp or properly handle.

It is also known that exposure to chemicals can also degrade the rope and ultimately cause its failure. Ropes which have been subjected to such exposure are frequently discarded and not used further as a precautionary measure if subjected to any corrosive chemicals. This may be true where chemicals are found on the ground where the rope has been lying and been exposed to such chemicals.

A further disadvantage of conventional multi-layer composite rope, particularly when used in rescue and safety applications, is its elasticity. While a conventional rope experiences a certain degree of stretch when under load, undue elasticity of a composite rope may adversely affect various rescue and safety operations. The use of a metal cable core avoids the problem of line loss due to heat, fire and severing problems. Composite ropes or cables, due to their elasticity, are difficult to tie and otherwise manipulate due to their flexible but unwieldy nature. In most cases a knot cannot be safely tied in the cable which will cinch tightly enough on itself to hold and provide safe connection of the line and it is normally difficult to increase the diameter of the cable by doubling it to facilitate grasping of the cable due to weight and other considerations. When a metal cable is employed, its outer surface is frequently too slippery to be securely grasped presenting an unsafe condition and is sometimes too abrasive to be handled safely depending upon the used condition of the cable. Various types of knotting of the cable at its end to various metallic fittings has not been satisfactory since the metallic core and outer sheaths may slide axially with respect to one another resulting in an unsafe condition.

Previously, the fastening of cable ends together or the securing of a single composite cable end to a support has encountered considerable difficulty. Where a strong joint is required at the line end, where the rope is fully fabricated having a metallic core, the line in some cases has been welded to connecting members requiring the use of heating apparatus which is destructive of the sheath of plastic material. Various clamping devices have been utilized but such devices have been found to withstand only very limited strain and do not clamp both the metallic core and the outer plastic sheath by separate clamping elements.

Previously the most efficient method of terminating textile ropes has been the "hand splice". Such method relies on the ability and experience of the assembly personnel, has a large variation of holding efficiencies from one clamp to another, and does not provide a satisfactory termination for a synthetic fibrous rope having an internal metallic wire core. A chemically potted termination has a high holding efficiency but is dependent upon the assembly technique and is very large in size. The internal wedge of "Fiege" type clamp is strong, does not rely on assembly proficiency of the fabricating personnel, but is still relatively large in size. The "swagged" type of end clamp can not normally be employed on synthetic textile-type ropes as it can on wire ropes, since the textile or fibrous nature of the rope reduces in diameter with tensile loading and pulls out of a termination that relies on compressive loading alone to hold the rope.

Another type of end clamp for a composite rope has been disclosed in pending U.S. patent application Ser. No. 07/518,572 filed May 3, 1990 now U.S. Pat. No. 5,022,780 entitled "End Clamp for Textile Rope With a Metallic Core", which application is owned by the same common assignee as the present application.

SUMMARY OF THE INVENTION

It is an object of this invention to provide an improved end clamp for a lightweight, manipulatable readily-grasped composite line of relatively high strength for use by personnel such as firemen, rescue workers, mountaineers and others involved in hazardous, rescue or safety conditions. The clamp and its method of attachment may be used with a multi-layered composite rope comprised of several combined sheaths of plastic materials with or without a multi-strand central metallic core. The clamp is particularly useful with a static composite rope having very little stretch and which will withstand exposure to elevated temperatures, sharp objects, chemicals, sunlight or shock which do not produce failure in the rope or require its premature disposal. The clamp is relatively simple in construction and provides a pair of interlocking tapered metallic elements which may be quickly attached to a rope end to withstand an unusual amount of strain or loading equal to or greater than the actual breaking strength of the rope itself.

It is another object of this invention to provide a composite rope end clamp which is capable of securely retaining both the exterior braided or woven layers of plastic material as well as a multi-strand metallic core, both of which are separately restrained in permanently clamped durable relation and which are resistant to relative axial movement of the sheaths along the core and with respect to each other.

A more specific object of this invention is to provide an improved rope end clamp for a flexible composite line of several different types and a unique method of attachment to such lines which clamp employs a solid or hollow tapered plug member which is fitted within the interior of a hollow metallic sleeve, the latter of which is swagged into reformed tapered condition overlying the plug member. The hollow sleeve is capable of being joined to various types of conventional end fittings such as a clevis or hook and which end clamp is capable of withstanding substantial loads. The outer plastic sheaths and the metallic core are separately clamped by the plug member fitted within a cylindrical opening of the hollow metallic sleeve for separate retention of the outer sheaths and the central core, when present, to positively retain the different plastic and metallic materials and to prevent relative axial movement of the diverse materials which comprise the composite rope.

The present invention relates to a durable end clamp for a composite line and method of connection wherein the core is preferably formed of a heat-resistant substantially inelastic metallic cable core preferably having two separately interwoven fibrous plastic sheaths fitted tightly thereabout. The subject clamp is particularly useful in terminating the end of a composite line having an inner fiber sheath braided tightly about the core and an outer fiber sheath braided tightly about and adhered to the inner sheath. The core has a tensile strength sufficient to separately support the desired rate of loading of the rope. The inner and outer sheaths have a combined tensile strength frequently exceeding the tensile strength of the core and contain the core therewithin in such manner that upon breakage of the core under excessive loading, the sheath elements substantially eliminate backlash of the rope and still retain the load. The core has sufficient weight and strength to minimize backlash of the inner and outer sheaths upon subsequent breakage thereof. The composite rope with which the subject clamp is particularly useful is one which will support the rated load even if the inner and outer sheaths are melted or severed by fire, heat or contact with sharp objects, the subject clamp preventing separation of the line at or near its retained end regardless of the adverse conditions encountered.

The end clamp may also be employed with a composite rope comprised of only the two inner and outer sheath members both consisting of separately interwoven multi-strand synthetic fibers, as well as a composite rope having a heat-resistant metallic multi-strand cable core surrounded by the said inner and outer sheath members. The clamp has either a solid or hollow tapered plug member, the latter being used with rope having the metallic cable core for its positive retention therewithin. The plug member is inserted into unfrayed fibers of the inner sheath with frayed fibers of both sheath members extending therearound which are thermally fused into a ball-like mass behind the plug exterior end. The purpose of fusing the fibers behind the plug is to prevent the fibers from slipping past the plug when tension is applied to the rope. A hollow sleeve member is placed over the plug member and the fused ball-like mass and then swagged around the plug member to form complementally tapering concentric surfaces, which permit the tapered plug to wedge the fibers against the tapered inner surface of the sleeve with increasing holding compression as the rope tension increases, the sleeve member then being connected to a rigid metallic conventional cable end fitting.

BRIEF DESCRIPTION OF THE DRAWINGS

A preferred embodiment of the invention, illustrative of the best mode in which the inventor has contemplated applying the principles: set forth in the following description, is set forth in the drawings, and is particularly and distinctly pointed out and set forth in the appended claims.

Similar numerals refer to similar parts and elements throughout the drawings.

DESCRIPTION OF THE PREFERRED EMBODIMENTS

Figure 1:
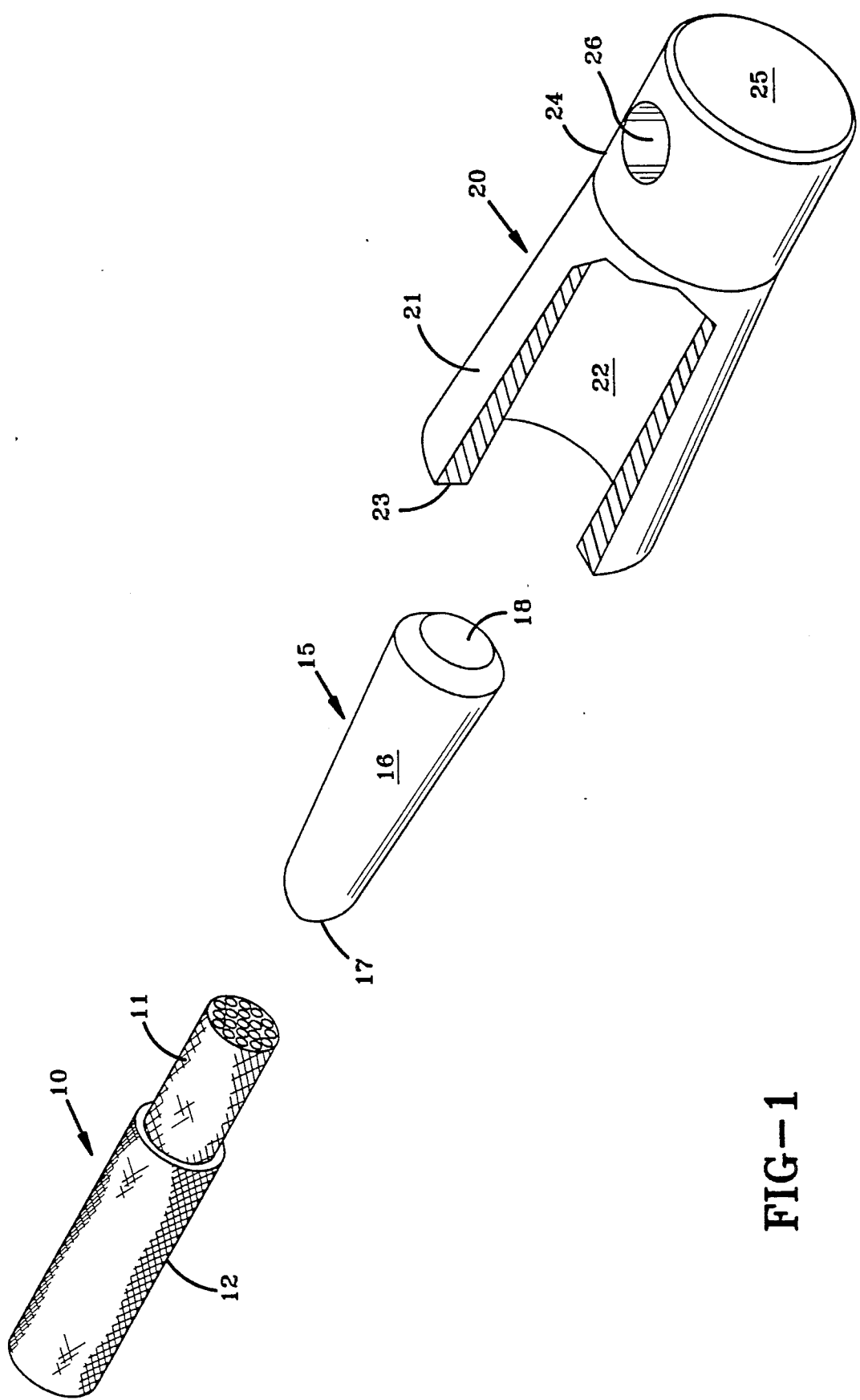
FIG. 1 is an exploded view of one type of composite rope comprised of only inner and outer sheaths of braided synthetic plastic fibers, and the several elements which comprise the rope end clamp.
Figure 2:
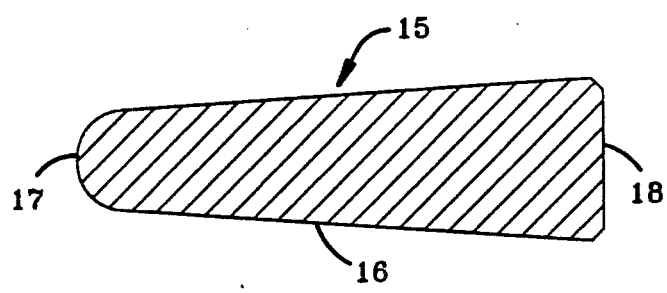
FIG. 2 is a vertical sectional view of a solid tapered plug member utilized in a first embodiment of the rope end clamp and method.
Figure 2A:
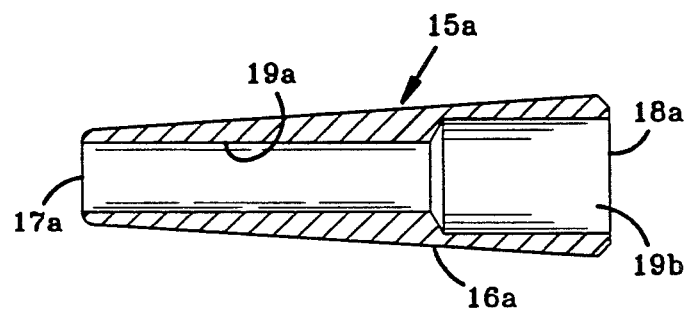
FIG. 2A is a view similar to FIG. 2 of a hollow tapered plug member utilized in a second embodiment of the rope end clamp and method.

A common first type of composite rope with which the subject invention is associated is one in which the rope is comprised of multiple sheaths of similar or dissimilar plastic materials. A most common type of all-plastic composite rope is one comprised of an inner nylon sheath and an outer polyester sheath. Both sheaths are comprised of interwoven and braided layers of heat-resistant fibrous multi-strand components constituting a multi-layer plastic rope. The outer polyester sheath shields the inner nylon sheath from exposure to sunlight and abrasion against which the polyester is particularly effective, the polyester thereby protecting the nylon sheath from both adverse conditions and prolonging the life and increasing the durability of the composite rope. The inner and outer sheaths are braided separately into diamond-like braids and are normally adhered to one another by an adhesive material to prevent their relative movement with respect to one another. The outer sheath may be securely adhered to the inner sheath by an adhesive material such as rubber cement having good adhesion to both materials and preventing relative slippage of one with respect to the other.

The inner sheath is normally comprised of a cylindrical braid of continuous nylon filaments or fibers such as 60 fibers braided to a standard well known eight-carrier braid construction. In the manufacture of such plastic composite rope, the inner core is interwoven into braided form. It is then normally passed upwardly through the center of an eight-carrier braiding apparatus and the outer sheath of polyester is tightly braided around the inner sheath in the form of conventional diamond braids.

The outer sheath is formed in a manner similar to that of the inner sheath but is preferably comprised of polyester fibers. The outer sheath is normally comprised of a cylindrical braid of polyester fibers such as 60 fibers braided to a standard eight-carrier braid construction over the inner sheath. As is well known in the art, the plastic fibers and braid configurations may be formed of other known plastic fibers and braid patterns to form the combined inner and outer sheaths having a substantial tensile strength which is resistant to water and most common chemicals.

The subject rope end clamp and method of application to a composite rope are useful for a wide variety of multiple sheath composite ropes as well as those having a metallic multi-strand core which are useful for more demanding use applications.

The first embodiment of the present invention as described hereinafter is for the method of attaching the end clamp to a multi-sheath composite rope comprised of different plastic materials in fibrous form intended for multi-purpose use without a metallic core. The separately braided multi-layers of the all-plastic rope reduce its elasticity and increase its strength, the layers being selected to utilize their individual properties to an optimum degree.

Several sheaths of different materials having different melting and softening point temperatures are used depending upon the chemical and physical properties of the prescribed compositions. A substantial tensile strength is obtained of the order of about 1,000 to 2,000 pounds per square inch in tension depending upon the thickness of the individual sheaths and overall diameter of the composite rope.

In a preferred embodiment of the present invention as utilized with a all-plastic composite rope, FIG. 1 shows in an exploded view such rope designated by the numeral 10 comprised of an inner sheath 11 and outer sheath 12. The end clamp is comprised of several elements including a tapered elongated solid metal plug 15 having an essentially smooth tapered exterior surface 16 and essentially right-cylindrical end surfaces 17 and 18 at its smaller and larger ends respectively. An elongated hollow sleeve member 20 having an overall length greater than plug member 15 is utilized as the second component of the clamp. One end portion of the sleeve 20 is hollow having an exteriorly tapering smooth surface 21, the taper extending from a central region to the open end extremity where the taper is larger in diameter. The interior surface 22 of the sleeve hollow portion has an essentially right-cylindrical contour, its diameter and length being greater than solid plug member 15. The hollow portion of sleeve member 20 terminates in a right-cylindrical open end surface 23, its hollow portion being adapted to enclose and completely surround the plug member 15. The other end portion 24 of the sleeve member 20 has an essentially solid right-cylindrical exterior surface 24 and a right-angled end surface 25 with a relatively large transverse aperture 26 extending through such solid end portion. Aperture 26 is adapted to receive a pin element of a connecting cable end fitting (not shown), which may be of a conventional nature, after the several components of the clamp are fitted to and positively engage the various elements of the all-plastic rope.

Figure 4:
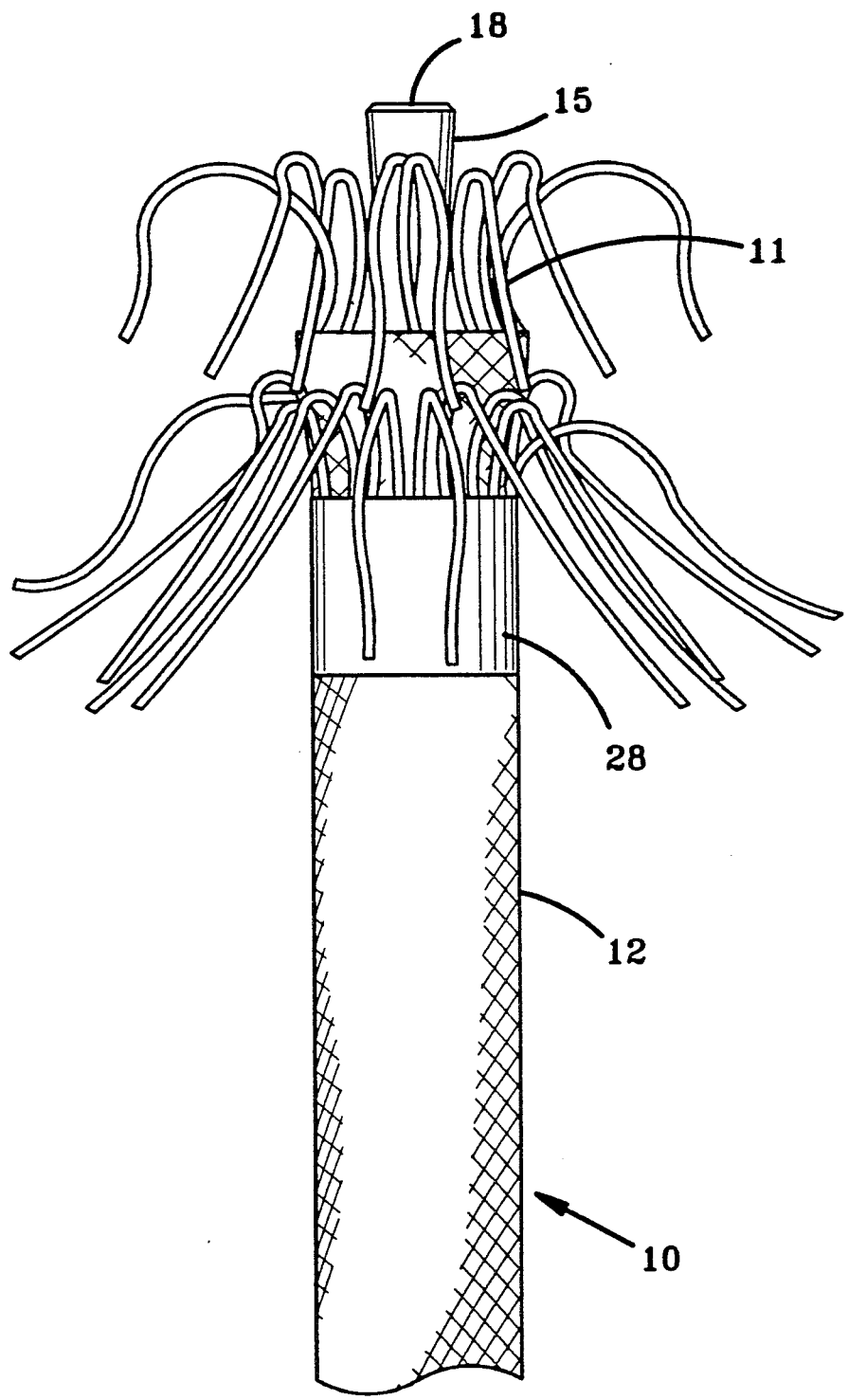
FIG. 4 is a side elevational view of the composite rope of the type shown in FIG. 1 with the several sheaths of plastic fibers in frayed condition and with the solid plug member as shown in FIG. 2 inserted therewithin.
Figure 5:
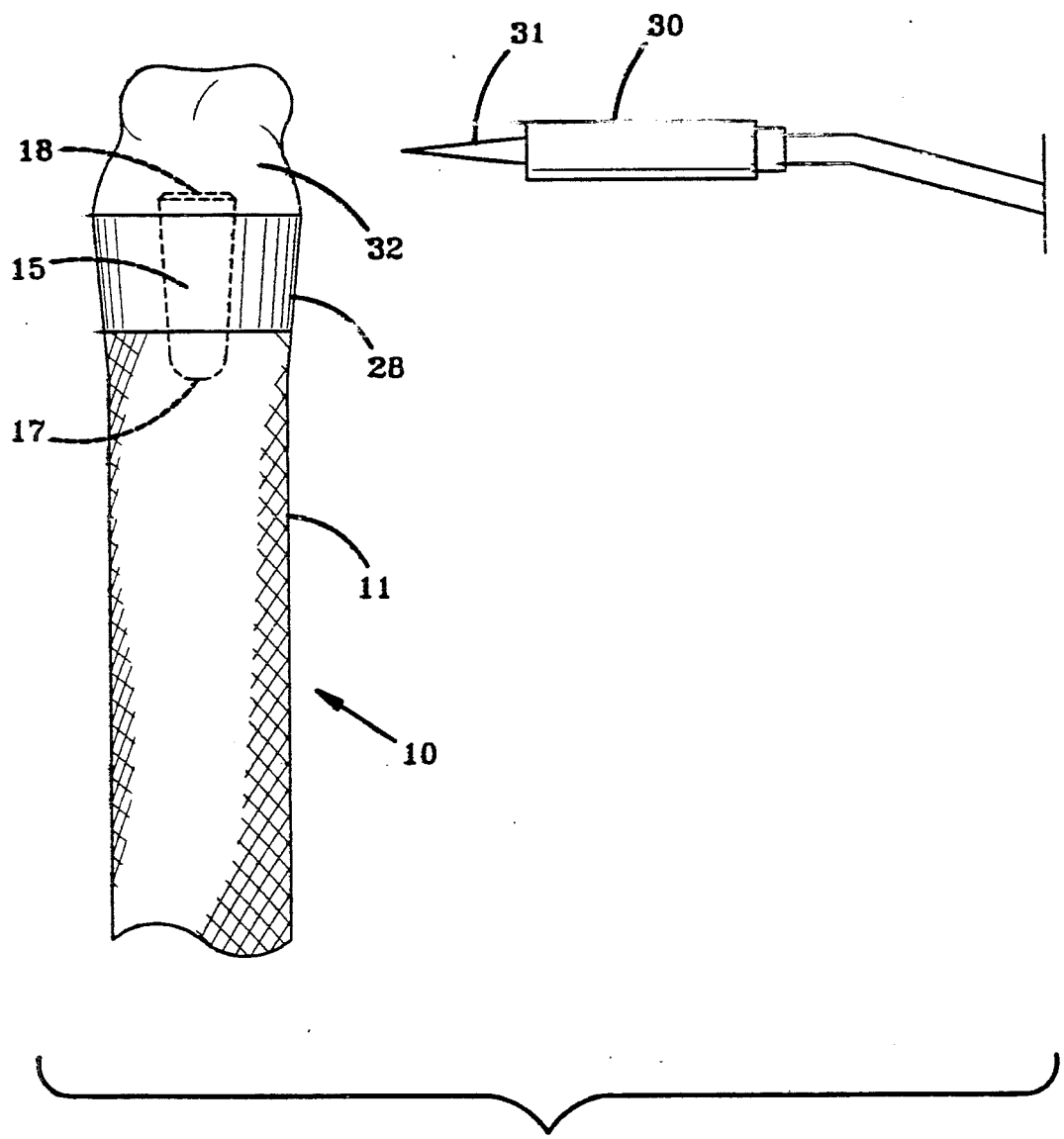
FIG. 5 is a view similar to FIG. 4 with the frayed fibers thermally fused around said solid plug member.
Figure 6:
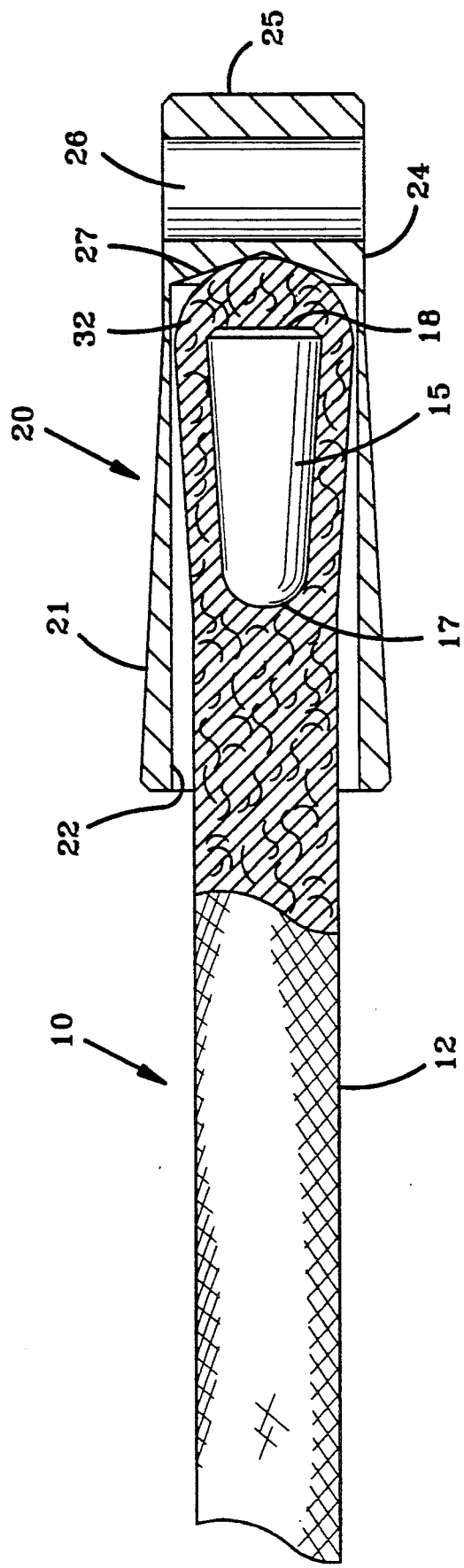
FIG. 6 is a view similar to FIG. 5 partially in vertical section showing a hollow sleeve member initially placed over and around said solid plug member and the fused fibers.

In practicing the method of the first embodiment of the present invention, as shown in FIG. 4, a short length of adhesive tape 28 is placed around the exterior of the plastic composite rope being located at an intermediate area adjacent one end of the rope. The interwoven fibers of inner and outer sheaths 11 and 12 are frayed or individually separated at the end area extending beyond the encircling tape 28. The solid plug member 15 is inserted forcefully into the unfrayed fibrous inner sheath 11 in concentric alignment therewith. The plug is then further driven into the unfrayed portions of both sheath members as shown in FIG. 5. The frayed fibers of both sheath members 11 and 12 are collected and brought together extending over and around the large end of plug member 15, the fibers being retained in an essentially tightly gathered bundle around the plug.

A heating element 30 such as a small torch having an open flame 31 as shown in FIG. 5 is brought into close proximity with the gathered fibers of both sheath members 11 and 12 to heat the fibers extending beyond the tape into a thermally-fused molten mass 32 surrounding and encompassing the larger end 18 of the plug member 15. The fused mass is tooled while in molten condition such as by a paddle so that its exterior diameter does not exceed the internal diameter of hollow sleeve member 20. The tape 28 is removed upon cooling of the fused fibers. The plug member 15 and its surrounding thermally-fused mass 32 are then placed into the hollow end portion of sleeve member 20 and seated therewithin closely adjacent the termination of the hollow portion. The sleeve may have a conical seat 27 at its hollow termination to receive the fused mass 32.

After seating the plug and its surrounding fused mass within sleeve member 20, its tapered exterior surface 21 of sleeve 20 is swagged by a suitable tooling mechanism (not shown) into an essentially right-cylindrical exterior configuration, the outer diameter of the sleeve member 20 then being as little as 40 percent larger than the exterior diameter of the unfrayed all-plastic composite rope 10. The tapered plug member and tapered sleeve member have an original taper of about 3 degrees. After swagging, the right-cylindrical interior surface of the sleeve member 20 is then tapered into closely complemental contour with the exterior surface of plug member 15, the degree of taper of both surfaces preferably being about three (3) degrees. Thus, the hollow sleeve member is converted by the swagging operation from being exteriorly tapered to interiorly tapered to provide a surface against which the plug member 20 wedges the fibrous strands of the rope to ensure positive retention of the fused and unfused fibrous elements of the several sheaths which are then permanently restrained between the metallic components of the clamp.

Figure 7:
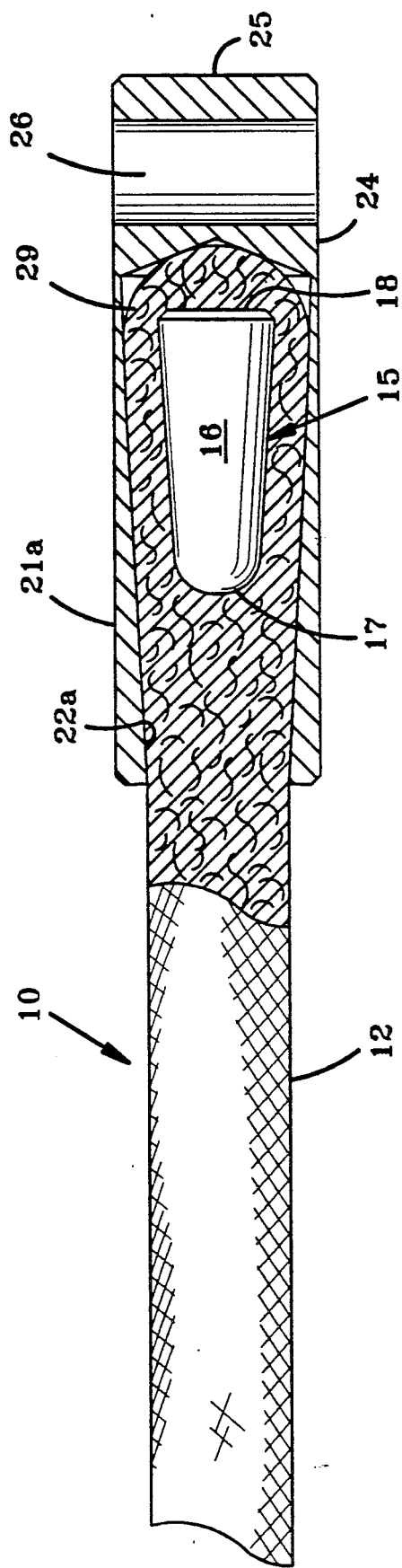
FIG. 7 is a view similar to FIG. 6 after the hollow sleeve member is swagged around said plug member and the fused fibers.

The subject end clamp as formed by the aforesaid method has been found to have a tensile strength closely similar to that of the all-plastic rope and in most cases exceeding such strength for varied connection operations. The aperture 26 in the essentially solid end portion of the sleeve member is adapted to interconnection with a wide variety of cable end fittings such as a clevis, hook or other such cable fittings having a pin type component for passage through the aperture in the sleeve. The subject end clamp may be interconnected to similar or dissimilar ropes or cables also having the same or other types of end clamps for their positive and durable interconnection, the end clamp having a strength which is substantially greater than that of the rope per se. FIG. 7 shows the end clamp in final swagged condition with the exterior surface of the sleeve member having a substantially uniform diameter which is right-cylindrical in configuration closely complemental to the body portion of rope 10 for its interconnection to separate fittings. The fused mass of plastic materials encompassing the plug member, as well as the fused and unfused fibers captured between the co-tapering surfaces of plug and sleeve, serve to restrain the several sheaths in firmly engaged durable relation.

Figure 8:
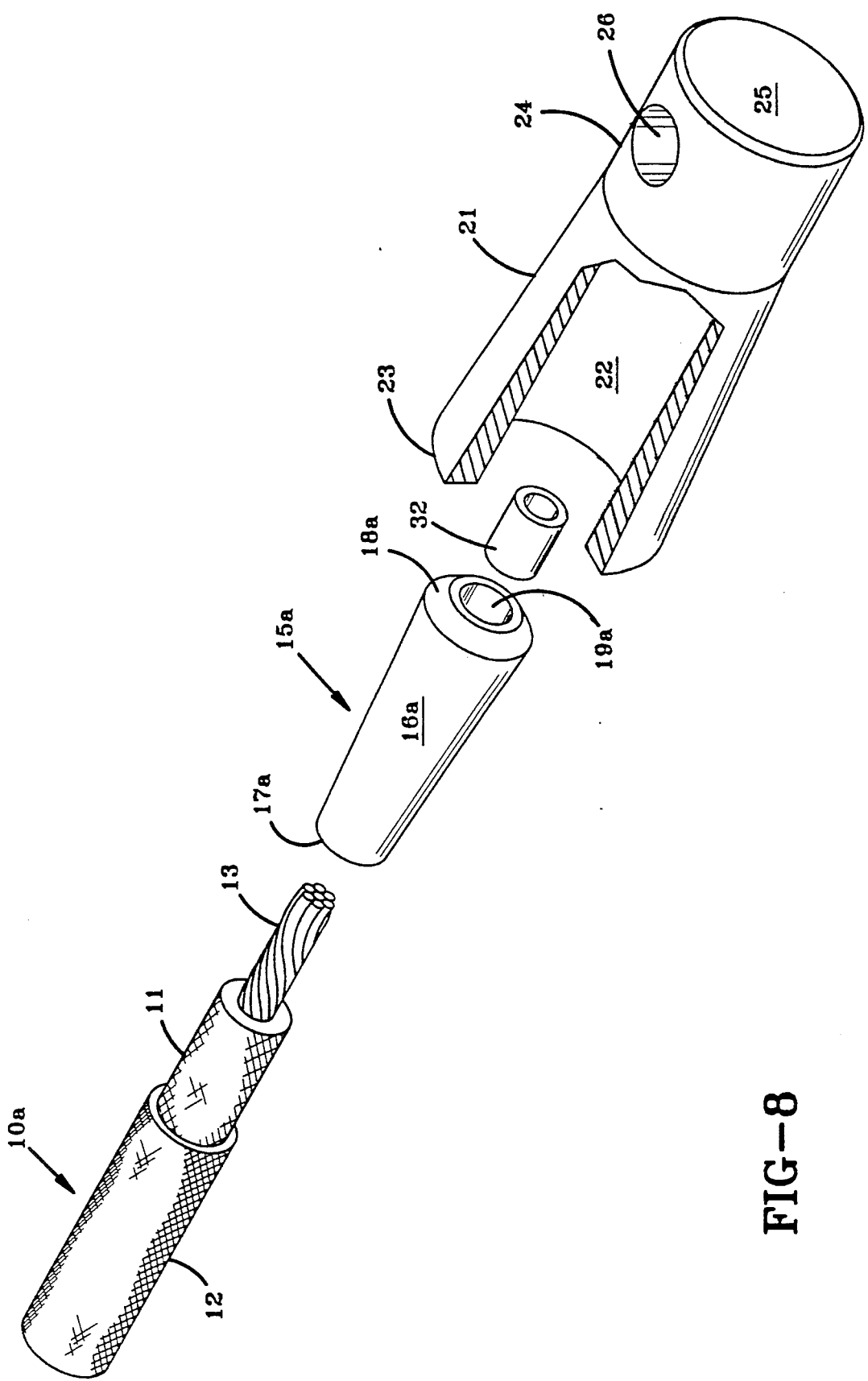
FIG. 8 is an exploded view similar to FIG. 1 of a second type of composite rope having a metallic cable core, a hollow tapered plug member and hollow sleeve member adapted to attachment to the end of said composite rope.

In a second embodiment of the invention as shown in FIG. 8, the composite rope 10A has a multi-strand twisted metallic core 13 surrounded by an inner plastic sheath 11 and an outer plastic sheath 12 as described hereinabove. The metallic core 13 is preferably comprised of interwoven or rotatably twisted small strands of stainless steel wire, for example. The core is comprised of multi-strand metallic elements such as one prefabricated of 10 to 20 strands of high-tensile strength steel, the core having a tensile strength of the order of about 7,000 psi. The core may also include high-tensile strength polymer fibers. The core may also have an elastic memory which causes the line to assume a coiled configuration whenever tension on the line is eliminated or released. The core may be woven or braided from a plurality of metal strands to provide a non-rotating cable core and therefore constitute a primary component of a non-rotating or non-rotatable rope.

The core may be comprised of multi-strand stainless steel elements alone or it may also include an interior core of polyaramid fibers sold under the trademark KEVLAR. One example of such cable is manufactured under U.S. Pat. No. 4,034,547 and sold by Loss & Company, Inc. under the trademarks K-KORE and K-FLEX. The exterior of the core may be coated with an adhesive material (not shown) such as rubber cement having proper adhesion to the exterior of the cable and the interior of the inner sheath 11 of the composite rope 10A. Inner and outer sheaths 11 and 12 are similarly formed and comprised of different selected materials as disclosed hereinabove. The several sheaths are normally comprised of interwoven braided plastic materials having different chemical and physical properties.

Figure 9:
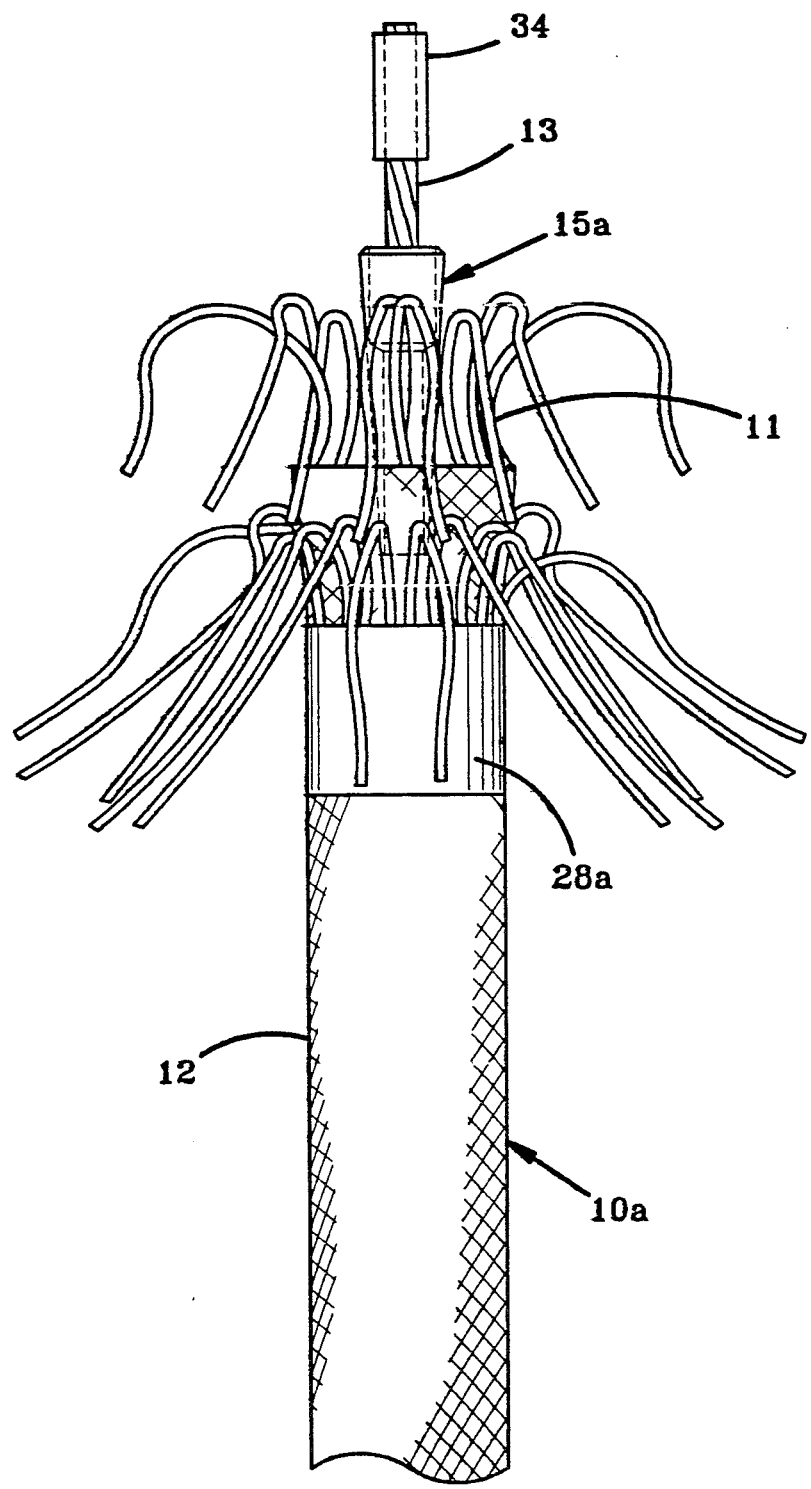
FIG. 9 is a side elevational view similar to FIG. 4 with the plastic fibers in frayed condition and the hollow plug member engaging the metallic cable core.

In the second embodiment of the present invention, as shown in FIGS. 8 and 9, metallic plug member 15A has a hollow interior 19a which is slightly larger than metallic core 13. In practicing the second method of attachment of the modified end clamp to the rope 10A, a short length of adhesive tape 28a is attached to an intermediate area of the rope adjacent one end thereof as shown in FIG. 9, the central metallic core 13 projecting for some distance beyond the plastic sheaths. The hollow plug member 15A is placed over and around the metallic core, the plug having an enlarged recess 19b at its larger end. A metallic tubular button element 34 is placed over and crimped around the terminating end of the metallic core 13 which is then drawn into the end cavity of the plug member in firmly seated relation. The several plastic sheaths 11A and 12A are frayed for a distance beyond the encircling tape member. As shown in FIG. 9, the hollow plug member 15a retaining the central metallic core 13 is driven into the unfrayed portion of inner sheath 11A. The frayed fibers of both sheaths 11 and 12 are collected together as described hereinabove with regard to FIG. 5, and the frayed fibers being then heated by the heating element 30.

Figure 3:
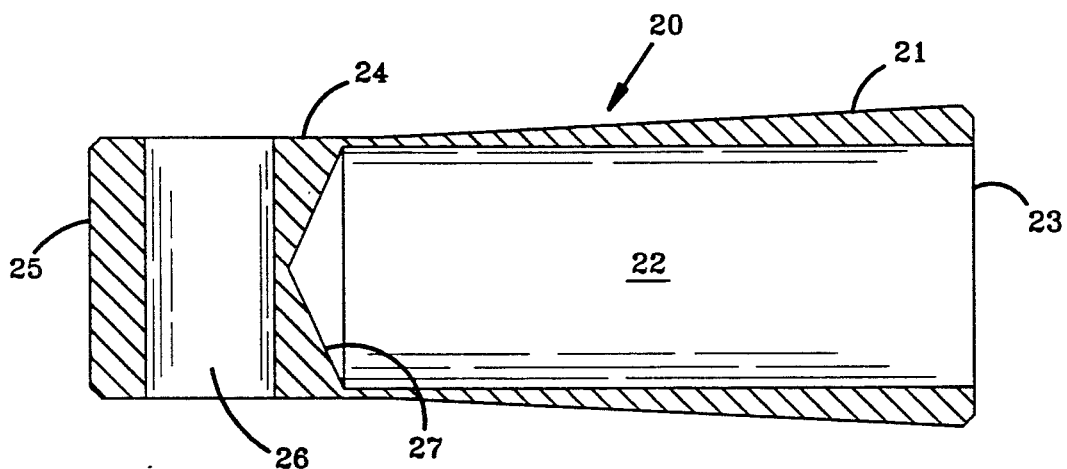
FIG. 3 is a vertical sectional view of a hollow sleeve member for use in combination with both types of plug members shown in FIGS. 2 and 2A.
Figure 10:
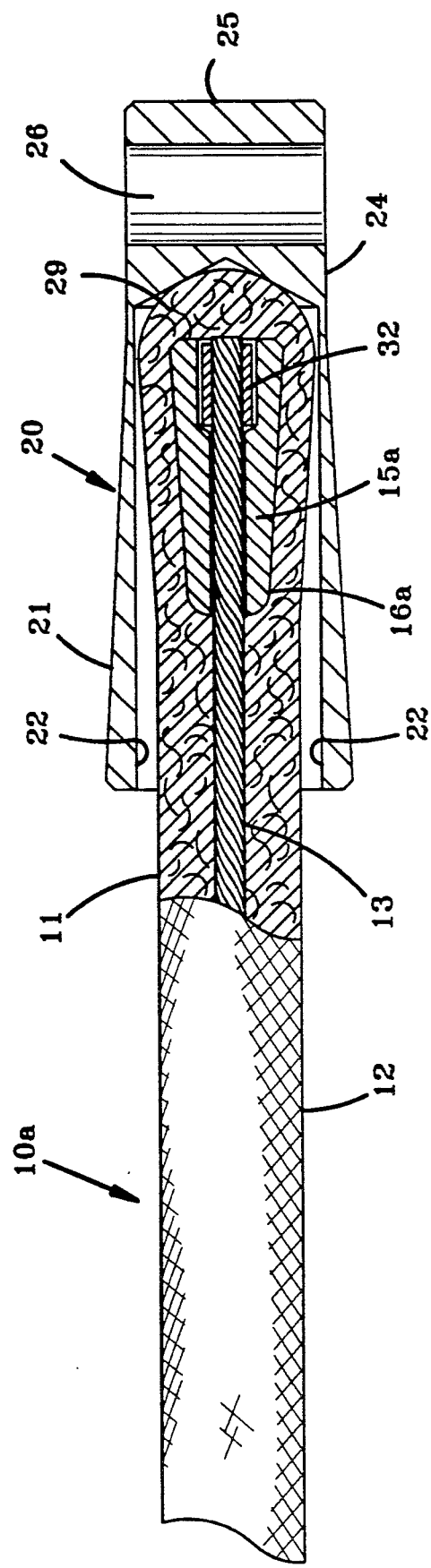
FIG. 10 is a view similar to FIG. 6 partially in vertical section showing the hollow tapered plug member engaging the metallic core and the hollow sleeve member initially placed over and around said hollow plug member and the fused fibers.
Figure 11:
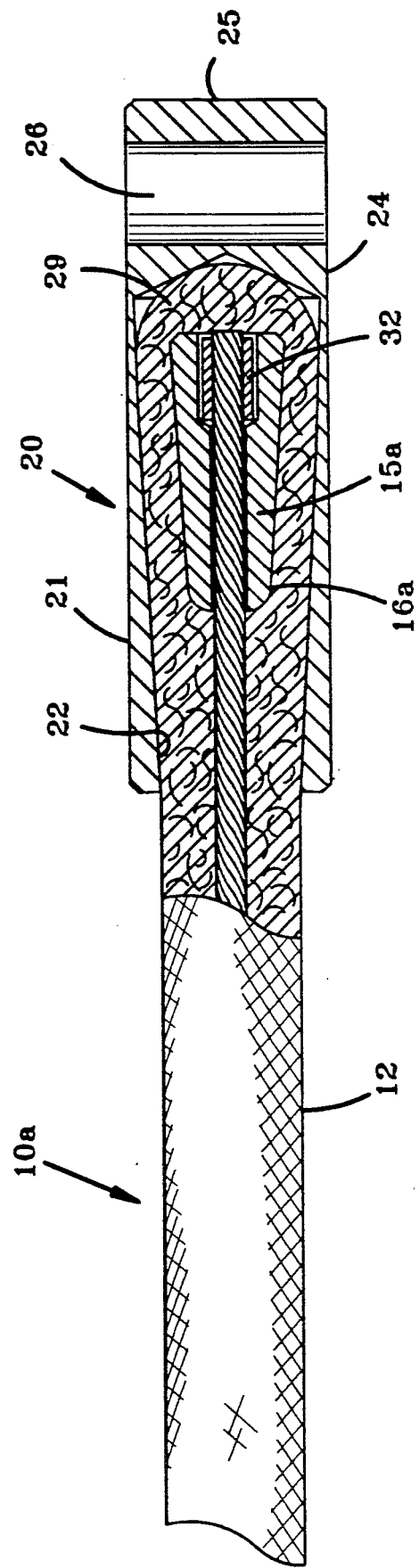
FIG. 11 is a view similar to FIG. 10 after the hollow sleeve member is swagged around said hollow plug member and the fused fibers.

The frayed fibers are thermally-fused into molten condition to form a fused mass 29a surrounding the large end extremity of the plug member 15a. The fused mass then encloses the crimped button 34 and metallic core end. The fused mass is formed having an exterior diameter lesser than the interior diameter of hollow sleeve member 20 as shown in FIG. 3. Hollow sleeve member 20 is then placed over and around the plug member and fused mass of the plastic fibers as shown in FIG. 10, the plug and fused mass being seated firmly within the extremity of the hollow cavity 22 in the sleeve member. Hollow sleeve member 20 at that time has an essentially right-cylindrical uniform diameter on its interior surface and a tapered surface on its exterior surface having a degree of taper of about three (3) degrees. The exterior surface of the hollow portion of sleeve member 20 is then swagged into an essentially right-cylindrical exterior surface and a tapered interior surface as described hereinabove. The interior surface of the sleeve is then formed with an inside taper closely complemental to that of the tapered hollow plug 15A. The exterior surface of the sleeve member is then essentially right-cylindrical in contour having a diameter as little as 40 percent larger than the composite rope 10a having the metallic core.

In each of the several forms of the subject rope clamp, a separate cable end fitting such as a clevis, eye, oval eye, or the like having a pin type component may be utilized to make a durable connection between the line and the fitting, and to another similar or dissimilar rope clamp depending upon the desired applications. The end clamp fabricated in accordance with the several illustrated embodiments of this invention exhibits great strength in tension comparable to the composite rope itself whether it be comprised of all plastic components or one having a metallic core.

The individual clamping of the different line materials serves to prevent any relative axial movement between the twin sheaths and the central core, or between the twin sheaths without the central core. In the event that any loosening of the diverse materials does occur, the remaining clamped portions prevent sudden release or separation of the clamp from the rope end with the double clamping action of the fused mass of the plastic materials and the mechanical grasping of the fused and unfused portions of the plastic sheaths. A double clamping action is obtained wherein the twin sheaths are not fully dependent one upon the other and its seat is essentially capable of carrying the rated load of the line.

Both the solid and hollow plug members of the several different embodiments are preferably comprised of lightweight aluminum or aluminum alloy, and the hollow sleeve member is also comprised of a similar material. The softer nature of the several metallic components, with the outer metallic member being swagged into firm engagement with the inner, ensures a positive solid seating of the rope components and especially where the wire core strands are employed.

Accordingly, the improved rope end clamp and method of attachment of this invention are simplified, provide a reliable, safe, inexpensive and efficient device which achieves all the enumerated objectives, provides for eliminating difficulties encountered with prior art devices, solves unique problems, and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved end clamp for a composite rope is constructed and used in several forms, the characteristics of the construction, and the advantageous, new and useful results obtained; the new and useful structures, devices, elements, arrangements, parts and combinations, are set forth in the appended claims.

I claim:

1. An end clamp for connecting the end of a composite rope having inner and outer sheath members, both comprised of individually interwoven multi-strand synthetic fibers, said end clamp comprising a metallic plug member having a tapered outer surface extending essentially continuously throughout its length with the frayed fibers of both said inner and outer sheath members extending over and around said plug member, a thermally-fused ball-like mass of said fibers encompassing the extremity of said plug member, a hollow tapered metallic sleeve member placed over and around said plug member and said ball-like mass in concentric alignment therewith, said sleeve member being swagged into tight co-tapering engagement with said plug member with said frayed fibers therebetween, and with the interior surface of the sleeve member having a swagged taper extending generally continuous throughout its length complementary to the continuous tapered exterior surface of the plug member.

2. An end clamp in accordance with claim 1, wherein said tapered metallic plug member is solid.

3. An end clamp in accordance with claim 1, wherein the smaller end of said tapered plug member is inserted into the unfrayed fibers of said inner sheath member and said fused ball-like mass extends over the larger end of said plug member, said ball-like mass having a lesser diameter than the interior diameter of said hollow sleeve member.

4. An end clamp in accordance with claim 1, wherein said hollow sleeve member has an end cap portion with a transverse aperture therein for connection to a separate metallic cable-end fitting having a pin member for insertion into said aperture.

5. An end clamp in accordance with claim 1, wherein said hollow sleeve member after swagging has a right-cylindrical contour complemental to the exterior diameter of said rope.

6. The end clamp in accordance with claim 1, wherein the said plug and hollow sleeve members are comprised of lightweight aluminum alloy for ease of handling and use.

7. An end clamp for connecting the end of a composite rope having a heat-resistant multi-strand metallic cable core surrounded by inner and outer fibrous multi-strand plastic sheath members wrapped tightly around said metallic core, said end clamp comprising a tapered hollow metallic plug member having said metallic cable core extending through its interior and projecting therebeyond, a hollow button member crimped around the projecting end of said metallic cable core and retained by the extremity of said plug member, said fibers of both said inner and outer sheath members being frayed and extending over and around the extremity of said plug member, a thermally-fused ball-like mass of said fibers encompassing the extremity of the larger end of said plug member, and a hollow tapered metallic sleeve member surrounding said plug member and said ball-like fused mass of said fibers in concentric alignment therewith, said sleeve member being swagged into firmly engaged co-tapering arrangement with said plug member and with said frayed fibers therebetween.

8. The end clamp in accordance with claim 7, wherein the said hollow sleeve member has a substantially right-cylindrical contour and an exterior diameter closely complemental to the exterior diameter of said rope.

9. The end clamp in accordance with claim 7, wherein both said hollow plug member and said hollow sleeve member have complemental juxtaposed tapered surfaces.

10. The end clamp in accordance with claim 7, wherein the smaller end of said tapered plug member is inserted into the unfrayed fibers of said inner sheath member and said fused ball-like mass extends behind the larger end of said plug member, said ball-like mass having a lesser diameter than the interior diameter of said hollow sleeve member.

11. The end clamp in accordance with claim 7, wherein said hollow sleeve member has a tapered exterior surface of about 3° taper and a cylindrical end cap portion with a transverse aperture therein for connection to a separate metallic cable-end fitting having a pin member for insertion into said aperture.

12. The end clamp in accordance with claim 7, wherein the said plug and hollow sleeve members are comprised of lightweight aluminum alloy for ease of handling and use.

13. The method of connecting an end fitting to the end of a composite rope having inner and outer sheath members, both comprised of individually interwoven multi-strand synthetic fibers, said method comprising the steps of:
  a) fraying both the inner and outer sheath members adjacent the rope end;
  b) inserting a tapered metallic plug member into the frayed fibers extending into an unfrayed portion of said inner sheath member in axial alignment therewith, the frayed fibers extending over and beyond the extremity of said plug member;
  c) collecting and heating the said frayed fibers extending beyond said plug member into molten condition to form a thermally-fused ball-like mass extending over and encompassing the extremity of said plug member;
  d) placing a hollow tapered metallic sleeve member over and around the said plug member and said ball-like mass encompassing the extremity of said plug member in concentric alignment therewith, said sleeve member initially having a tapered exterior surface; and
  e) swagging the said hollow tapered metallic sleeve member around said plug member and said ball-like mass with said fibers therebetween to form a high-tensile-strength wedging connection between said sleeve member and said composite rope, with the exterior surface of the sleeve member being swagged into an essentially right-cylindrical contour closely complemental to the exterior diameter of the composite rope.

14. The method of connecting an end fitting to the end of a composite rope having inner and outer sheath members, both comprised of individually interwoven multi-strand synthetic fibers, said method comprising the steps of:
  a) fraying both the inner and outer sheath members adjacent the rope end;
  b) inserting a tapered metallic plug member into the frayed fibers extending into an unfrayed portion of said inner sheath member in axial alignment therewith, the frayed fibers extending over and beyond the extremity of said plug member;
  c) collecting and heating the said frayed fibers extending beyond said plug member into molten condition to form a thermally-fused ball-like mass extending over and encompassing the extremity of said plug member;
  d) placing a hollow tapered metallic sleeve member over and around the said plug member and said ball-like mass encompassing the extremity of said plug member in concentric alignment therewith, said sleeve member initially having an interior surface initially cylindrical in shape and a tapered exterior surface; and
  e) swagging the said hollow tapered metallic sleeve member around said plug member and said ball-like mass with said fibers therebetween to form a high-tensile-strength wedging connection between said sleeve member and said composite rope, with the cylindrical interior surface of the sleeve member being swagged into a taper essentially complemental to the tapered plug member, and the exterior surface of the sleeve member being swagged into a right-cylindrical surface.

15. The method of connecting an end fitting to the end of a composite rope having inner and outer sheath members, both comprised of individually interwoven multi-strand synthetic fibers, said method comprising the steps of:
  a) fraying both the inner and outer sheath members adjacent the rope end;
  b) inserting a tapered metallic plug member into the frayed fibers extending into an unfrayed portion of said inner sheath member in axial alignment therewith, the frayed fibers extending over and beyond the extremity of said plug member;
  c) collecting and heating the said frayed fibers extending beyond said plug member into molten condition to form a thermally-fused ball-like mass extending over and encompassing the extremity of said plug member;
  d) placing a hollow tapered metallic sleeve member having a tapered exterior surface over and around the said plug member and said ball-like mass encompassing the extremity of said plug member in concentric alignment therewith; and
  e) swagging the said hollow tapered metallic sleeve member around said plug member and said ball-like mass with said fibers therebetween to form a high-tensile-strength wedging connection between said sleeve member and said composite rope with said tapered exterior surface being swagged into a tapered interior surface substantially complemental to the exterior surface of said plug member.

16. The method in accordance with claim 15, wherein said tapered plug member is solid.

17. The method in accordance with claim 15, wherein said tapered metallic plug member is forcefully inserted into the unfrayed fibers of said inner sheath member prior to collecting and heating the frayed fibers extending over and around said plug member.

18. The method in accordance with claim 15, including the step of connecting a separate metallic cable-end fitting to the extremity of said sleeve member extending away from said composite rope for interconnection thereto.

19. The method in accordance with claim 15, wherein said hollow sleeve member has an end cap portion with a transverse aperture therein for connection to a separate metallic cable-end fitting having a pin member for insertion into said aperture.

20. The method in accordance with claim 15, including the step of thermally fusing the frayed fibers of said inner and outer sheath members into a fused ball-like mass having a diameter less than the inner diameter of said hollow sleeve member.

21. The method in accordance with claim 15, wherein the taper of the plug member is complemental to the taper of the swagged interior surface of the hollow sleeve member.

22. The method of connecting an end fitting to the end of a composite rope having a heat-resistant multi-strand metallic cable core surrounded by inner and outer fibrous multi-strand plastic sheath members wrapped tightly around said metallic core, said method comprising the steps of:

a) fraying both said inner and outer plastic sheath members away from said metallic core adjacent the rope end;

b) forcefully inserting a tapered elongated hollow metallic plug member into the said frayed fibers of said sheath members with its smaller end extending into an unfrayed portion of said inner sheath member in co-axial alignment therewith, the frayed fibers extending over and beyond the extremity of said plug member, with said metallic core extending through said hollow plug member and projecting therebeyond;

c) placing a hollow button member around the projecting end of said metallic core;

d) crimping said button member into firm engagement with said metallic core, said plug member having an end cavity portion adapted to receive and retain said button member and crimped cable core end;

e) collecting and heating the said frayed fibers extending beyond said plug member into molten condition to form a thermally-fused ball-like mass extending over and encompassing the extremity of said plug member to secure the fibers to said plug member;

f) placing a hollow tapered metallic sleeve member over and around the said plug member and said fused ball-like mass encompassing the extremity of said plug member in concentric alignment therewith; and g) swagging the said hollow tapered metallic sleeve member around said plug member and said fused ball-like mass with said frayed fibers therebetween to form a high-tensile-strength interconnection between said metallic sleeve member and said composite rope.

23. The method in accordance with claim 22, including the step of swagging the hollow exterior sleeve member into a substantially right-cylindrical contour having an exterior diameter closely complemental to the exterior diameter of said rope.

24. The method in accordance with claim 22, including the step of containing the separate metallic crimped button fitting in the cavity of said plug member for durable interconnection to said rope.

25. The method in accordance with claim 22, including the step of collecting and heating the said frayed fibers into a thermally-fused ball-like mass having a lesser diameter than the interior diameter of said hollow sleeve member.

26. The method in accordance with claim 22, wherein the said hollow sleeve member having an initial cylindrical interior surface is swagged into a tapered interior surface while the initially tapered exterior surface is swagged into an essentially right-cylindrical exterior surface.

27. The method in accordance with claim 22, including the step of precisely centering the said hollow plug member on said metallic core member and said hollow metallic sleeve member similarly on said plug member.

28. The method in accordance with claim 22, wherein the said metallic plug member and said hollow metallic sleeve member initially have complemental tapering surfaces extending in the same lineal directions.

29. The method in accordance with claim 22, wherein the said hollow sleeve member has a solid end cap portion with a transverse aperture therein for interconnection to a separate metallic end fitting having a pin portion for entry into said aperture.

30. The method in accordance with claim 22, wherein the said hollow button member and said end cavity portion of said hollow plug member are closely complemental in dimensions to retain the metallic core firmly within said plug member.

* * * * *